United States Patent
Goossens et al.

(10) Patent No.: US 9,069,577 B2
(45) Date of Patent: Jun. 30, 2015

(54) GROUPING AND BROWSING OPEN WINDOWS

(75) Inventors: Thomas Goossens, Paris (FR); Fabrice Robinet, Puteaux (FR)

(73) Assignee: Apple Inc., Cupertino, CA (US)

(\*) Notice: Subject to any disclaimer, the term of this patent is extended or adjusted under 35 U.S.C. 154(b) by 342 days.

(21) Appl. No.: 12/953,391

(22) Filed: Nov. 23, 2010

(65) Prior Publication Data

US 2012/0131496 A1    May 24, 2012

(51) Int. Cl.
| | |
|---|---|
| *G06F 3/048* | (2013.01) |
| *G06F 9/44* | (2006.01) |
| *G06F 3/0481* | (2013.01) |
| *G06F 3/0483* | (2013.01) |

(52) U.S. Cl.
CPC ............ *G06F 9/4443* (2013.01); *G06F 3/0481* (2013.01); *G06F 3/0483* (2013.01)

(58) Field of Classification Search
USPC ........................................................ 715/784
See application file for complete search history.

(56) References Cited

U.S. PATENT DOCUMENTS

| | | | | |
|---|---|---|---|---|
| 5,745,115 | A * | 4/1998 | Purple et al. ................... | 715/810 |
| 6,725,427 | B2 | 4/2004 | Freeman et al. | |
| 7,159,189 | B2 | 1/2007 | Weingart et al. | |
| 2006/0161847 | A1 * | 7/2006 | Holecek et al. ............... | 715/716 |
| 2006/0161861 | A1 * | 7/2006 | Holecek et al. ............... | 715/782 |
| 2006/0253791 | A1 | 11/2006 | Kuiken et al. | |
| 2008/0005693 | A1 | 1/2008 | Oliver et al. | |
| 2008/0307359 | A1 * | 12/2008 | Louch et al. ................... | 715/835 |
| 2008/0307360 | A1 | 12/2008 | Chaudhri et al. | |
| 2010/0153399 | A1 | 6/2010 | Oliver et al. | |
| 2010/0211872 | A1 | 8/2010 | Rolston et al. | |
| 2011/0087982 | A1 * | 4/2011 | McCann et al. ............... | 715/769 |

FOREIGN PATENT DOCUMENTS

EP    697691 A2    2/1996

OTHER PUBLICATIONS

"BumpTop", Wikipedia [online], [retrieved on Aug. 8, 2010]. Retrieved from the Internet: <URL: http://en.wikipedia.org/wiki/BumpTop>, 5 pages.

(Continued)

*Primary Examiner* — Matt Kim
*Assistant Examiner* — William Trapanese
(74) *Attorney, Agent, or Firm* — Fish & Richardson P.C.

(57) ABSTRACT

Methods, systems, and computer-readable media for managing open windows in a desktop GUI are disclosed. In various implementations, open windows displayed within a 2D desktop plane can be organized into one or more 3D browsable stacks in a 3D desktop space, where each stack includes open windows associated with a common value for a grouping property. A graphical representation indicating the respective value of the grouping property associated with each 3D browsable stack can be displayed in proximity to the 3D browsable stack. As the user browses through the open windows in the browsable stack, one window is displayed in a frontal view at a time while the other windows are displayed in a side view. When the user selects an open window from the stack, the 3D desktop can be restored to the 2D desktop showing the selected window as the current active window of the 2D desktop.

24 Claims, 10 Drawing Sheets

(56) References Cited

OTHER PUBLICATIONS

Anand Agarawala et al: "Keepin' It Real: Pushing the Desktop Metaphor with Physics, Piles and the Pen", Conference Proceedings/CHI 2006, Conference on Human Factors in Computing Systems: Montreal, Quebec, Canada, Apr. 22-27, 2006; pp. 1283-1292, XP-002566457.
Richard Mander et al., "A 'Pile' Metaphor for Supporting Casual Organization of Information", Proceedings of the Conference on Human Factors in Computing Systems, Reading, Addison Wesley, US, May 3-7, 1992, pp. 627-634, XP000426843.
Aaron Weiss, "Desktops in 3D," ACM, 2 Penn Plaza, Suite 701, New York, USA, Mar. 2007, pp. 26-33, XP-040058317.
The Netherlands Search Report and Written Opinion for Application No. 2007843 dated Mar. 20, 2012, 11 pages.
PCT Notification of Transmittal of the International Search Report and the Written Opinion for Application No. PCT/US11/61250 mailed Mar. 29, 2012, 8 pages.
European Search Report issued in International Application No. 11190323.3-2211, Mar. 16, 2012, 9 pages.
Australian Patent Examination Report No. 1 issued in International Application No. 2011253548, Nov. 27, 2012, 3 pages.
International Preliminary Report on Patentability received international application No. PCT/US2011/061250 on Jun. 6, 2013, 7 pages.

* cited by examiner

GROUPING AND BROWSING OPEN WINDOWS

TECHNICAL FIELD

This disclosure relates generally to providing information on computers and other devices.

BACKGROUND

A modern computing device, such as a personal computer, a smart phone, a game device, a handheld computer, a GPS device, and so on, includes a software operating system that allows the computer device to be controlled either directly by the user or by one or more application programs executing within the operating system.

Many operating systems and software applications employ graphical user interfaces (GUIs) to present information to users and to receive user input for controlling the behavior and functionalities of the underlying computing devices and/or application programs. A typical two-dimensional GUI of an operating system can be described as a "desktop" metaphor. Many software applications executing in the operating system can provide graphical objects, so-called "windows," to present information content and various input control elements. Visually, a two-dimensional desktop of an operating system provides a background plane on which application windows provided by active software applications can be displayed.

Operating systems of the computing devices can often support multiple active applications at the same time, and each of the active applications can have multiple open windows concurrently presented on the desktop. Various schemes for managing the presentation and layout of open windows on the desktop have been proposed to improve the organization and navigation of the open windows.

SUMMARY

This disclosure relates generally to presentation and management of Desktop GUIs and opening windows on the desktop GUIs.

In general, one innovative aspect of the subject matter described in this specification can be embodied in methods that include the actions of: grouping a plurality of open windows into one or more groups based on respective values of a grouping property associated with the plurality of open windows, each group of open windows sharing a common value for the grouping property; and causing each group of open windows to be presented in a respective stack, where the respective stack includes representations of the open windows in the group and permits user browsing through the representations.

Other embodiments of this aspect include corresponding systems, apparatus, and computer programs, configured to perform the actions of the methods, encoded on computer storage devices.

These and other embodiments can each optionally include one or more of the following features.

In some implementations, the method further includes the actions of: resenting the plurality of open windows in a two-dimensional (2D) desktop environment; and while the open windows are presented in the 2D desktop environment, detecting an input for browsing the plurality of open windows, where the groups of open windows are presented in the groups' respective stacks in response to the detecting, and the respective stacks are presented in a three-dimensional (3D) desktop environment.

In some implementations, the grouping property is an application type associated with the open windows, and each group of open windows include the open windows provided by a common application executing in the 2D desktop environment.

In some implementations, the method further includes the actions of: presenting a respective graphical representation indicative of the value of the grouping property associated with each group of open windows in proximity to the stack associated with the group.

In some implementations, the method further includes the actions of: detecting an input for browsing a first stack including a first group of open windows; and in response to the detecting, cycling through the representations of the open windows in the first stack one by one, presenting one representation in a first view while keeping other representations in the first stack in a second view.

In some implementations, the input is a hovering event by a pointing device over the first stack.

In some implementations, the action of cycling through the representations of the open windows in the first stack further includes the actions of: determining a position of the hovering event relative to the first stack; determining a browsing direction based on the position of the hovering event; and cycling through the representations of the open windows in the stack in the determined browsing direction.

In some implementations, the input is a scrolling event received from an input device, and the action of cycling through the representations of the open windows in the first stack further includes the actions of: determining a scrolling direction of the scrolling event; and cycling through the representations of the open windows in the stack in the scrolling direction.

In general, one innovative aspect of the subject matter described in this specification can be embodied in methods that include the actions of: presenting a plurality of open windows in a two-dimensional (2D) desktop environment; detecting an input for browsing the plurality of open windows; in response to detecting the input, grouping the plurality of open windows into one or more groups of open windows based on respective values of a grouping property associated with the plurality of open windows, each group of open windows sharing a common value for the grouping property; and presenting each group of open windows in a respective stack in a three-dimensional (3D) desktop space, where the respective stack includes 3D representations of the open windows in the group, and permits user browsing through the representations one by one.

In general, one innovative aspect of the subject matter described in this specification can be embodied in methods that include the actions of: presenting a plurality of open windows in a two-dimensional (2D) desktop environment, each open window being provided by a respective application executing in the 2D desktop environment; receiving a first user input for browsing the plurality of open windows; in response to the first user input, dividing the plurality of open windows into one or more groups of open windows based on respective values of a grouping property associated with the plurality of open windows, each group of open windows being associated with a common value for the grouping property; and presenting each group of open windows in a respective three-dimensional (3D) browsable stack in a 3D desktop space, where the respective 3D browsable stack include 3D representations of the open windows in the group, and only one of the 3D representations is presented in a frontal view in the respective 3D browsable stack at a time.

Other embodiments of this aspect include corresponding systems, apparatus, and computer programs, configured to perform the actions of the methods, encoded on computer storage devices.

These and other embodiments can each optionally include one or more of the following features.

In some implementations, the grouping property is an application type associated with the open windows, and each group of open windows include the open windows provided by a common application executing in the 2D desktop environment.

In some implementations, a respective graphical representation indicative of the value of the grouping property associated with each group of open windows can be presented in proximity to the respective 3D browsable stack associated with the group.

In some implementations, the grouping property is an application type associated with the open windows, and the graphical representation indicative of the value of the grouping property associated with each group of windows is an enlarged icon for the respective application providing the open windows in the group.

In some implementations, the methods further include actions of: receiving a second user input for browsing a first 3D browsable stack in the one or more 3D browsable stacks; and in response to the second user input, cycling through the 3D representations of the open windows in the first 3D browsable stack one by one, presenting one 3D representation in the first 3D browsable stack in the frontal view while presenting other 3D representations in the first 3D browsable stack in a side view.

In some implementations, the second user input is a hovering event by a pointing device detected over the first 3D browsable stack. To cycle through the 3D representations of the open windows in the first 3D browsable stack one by one: a position of the hovering event relative to the first 3D browsable stack can be determined; a browsing direction can be determined based on the position of the hovering event; and the 3D representations of the open windows in the 3D browsable stack can be cycled through one by one in the determined browsing direction.

In some implementations, the second user input is a scrolling event received from an input device. To cycle through the 3D representations of the open windows in the first 3D browsable stack one by one: a scrolling direction of the scrolling event can be determined; and the 3D representations of the open windows in the 3D browsable stack can be cycled through one by one in the scrolling direction.

In some implementations, the method further include the actions of: receiving a second user input for selecting one of the 3D representations in one of the 3D browsable stacks; and in response to the second user input, restoring the 2D desktop environment from the 3D desktop space and presenting the open window associated with the selected 3D representation as a current active window of the 2D desktop environment.

Particular embodiments of the subject matter described in this specification can be implemented to realize one or more of the following advantages.

Within a three-dimensional (3D) desktop space, open windows can be grouped according to a grouping property (e.g., file type, application type, etc.) associated with the open windows. Each group of open windows can be displayed in a respective 3D browsable stack. By specifying an appropriate grouping property, the user can categorize a large number of open windows into a smaller number of groups. The user can first select a group that is of interest and then locate the window of interest within the selected group. The grouping of windows can help the user avoid having to search through the large number of open windows in groups that are not of interest at the time, and thus provide improved operation efficiency.

Only one window in each 3D browsable stack is displayed in the frontal view while all other windows in the stack are displayed in a side view. The user can browse through individual stacks and see the open windows within each stack. As the user browses through a stack, each open window in the browsable stack is rotated into the frontal view one by one, while the other open windows are kept in or restored to the side view. By keeping most of the open windows (e.g., all windows but one) in the stack in the side view, a large number of open windows can be simultaneously visible and selectable within the limited screen space. The need for moving windows around a cluttered a two-dimensional (2D) desktop in order to reveal and locate a hidden window can be avoided.

A respective graphical representation (e.g., an application icon) indicative of the value of the grouping property associated with each group of windows can be presented in proximity to the 3D browsable stack associated with the group. The graphical representations can provide a visual cue for the user to recognize the group of windows included in each browsable stack, so that the user can easily locate the group of interest.

When the user interacts with a 3D browsable stack, an application menu bar of the current active window in the 3D browsable stack can be displayed at a designated menu location on the 3D desktop. The application menu bar and the current active window together can provide the full range of interactive capabilities that the native application environment of the open window would allow within a 2D desktop environment, even though the open window is currently displayed within the 3D browsable stack. Therefore, the browsable stack provides an environment where the user can start working within an open window any time, and resume browsing at any time, without the need to exit the 3D browsable stack view.

By enabling the full-range of interactive capabilities of an application environment of an open window within the 3D browsable stack view, the user can enjoy the benefit of both the quick and easy browsing capability of the 3D browsable stack, and the full range of interaction that is conventionally only available for an active window in a 2D desktop environment.

In some implementations, when the user selects or starts working within an open window in a 3D browsable stack, the user interface can be automatically restored to the 2D desktop showing the selected open window as the current active window of the 2D desktop. By restoring to the 2D desktop, the selected open window can be presented in an enlarged size as compared to the frontal view in the 3D browsable stack, and making the open window easier to see and interact with.

The details of one or more implementations of the methods, systems, and computer-readable media are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Overview

Figure 1A:
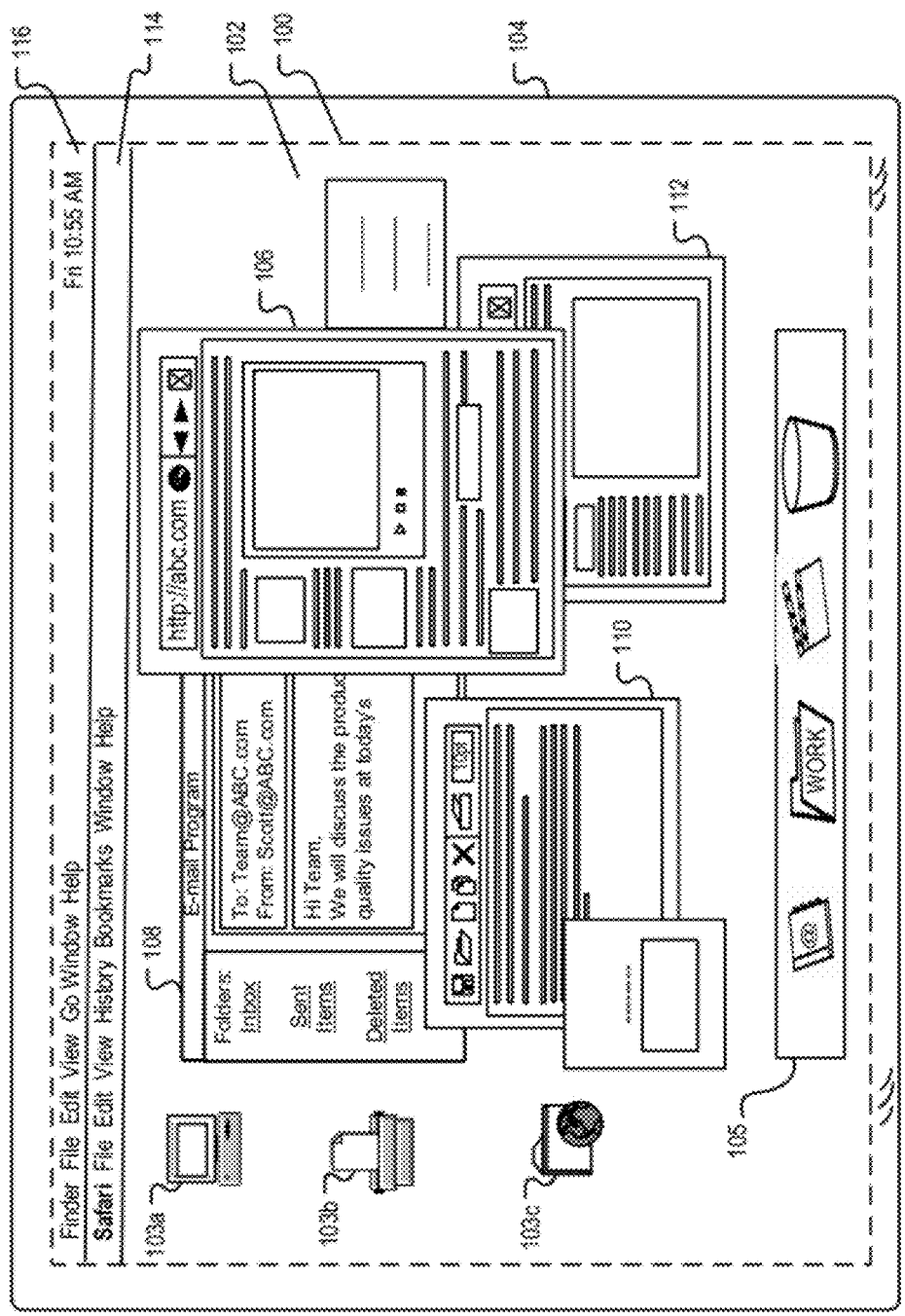
FIG. 1A illustrates an exemplary 2D desktop containing multiple open windows.

Computing systems, such as personal computers, handheld devices, smart phones, gaming devices, portable computers, and so on, typically include hardware components such as a processing unit (e.g., one or more processors), memory, and various input and output devices (e.g., a display, a keyboard, a mouse, a touch-sensitive surface). A software operating system (O/S) can be installed on the computing system and executed by the processing unit to control the operations of the computing system.

Many operating systems and software applications employ graphical user interfaces (GUIs) to present information to users and to receive user input for controlling the behavior and functionality of the underlying computing devices and/or application programs. A typical two-dimensional (2D) GUI of an operating system can be described as a "desktop" metaphor.

Visually, a 2D desktop of an operating system can provide a background (e.g., a desktop plane) on which other graphical objects, such as icons representing connected peripheral devices (e.g., disk drives, network devices, printers, etc.), installed programs, stored documents, open windows of executing application programs, file system folders, and so on, can be presented. In addition, user interface elements that allow user interaction with some aspects of the operating system can be presented at various locations on the desktop as well. For example, a desktop root menu bar showing basic controls of the desktop environment, a system tray showing programs executing in the background, a docking station for shortcuts to frequently used application programs, and so on, can also be presented on the desktop plane.

An operating system of a computing device can often support a large number of active applications at the same time, and each of the active applications can have multiple open windows concurrently presented on the desktop plane. The user can switch among the active applications and the open windows by selecting (e.g., clicking on) the window he/she wishes to access. Upon user selection, the selected open window can obtain input focus and become the current active window (or "top window") of the desktop. The user can interact with the current active window in a manner dictated by the application program providing the active window.

In a 2D desktop environment, the visible area for presenting graphical objects, such as icons, user interface elements, and open application windows, are constrained by the size of the display screen. Even though widescreen displays and software applications for extending the operating system's desktop across multiple displays have become available, navigation among a multitude of open windows and desktop icons can still be a challenging task, especially when the windows and other graphical objects overlap and obscure one another from the plain view of the desktop plane.

Some three-dimensional (3D) desktop environments have been proposed in which more space is made available for spatially organizing of user interface elements and graphical objects in the 3D desktop environments. However, with the increased availability of space and complexity in manipulating graphical objects in a 3D space, these 3D desktop environments are often too complex and difficult to navigate as well.

As described herein, the GUI of an operating system can easily switch between a 2D desktop environment and a 3D desktop environment based on user election. In the 2D desktop environment, when the user wishes to see all windows currently open in the desktop environment, the user can enter a particular input command to cause the desktop to enter an exposé mode. In the exposé mode, the open windows can be scaled down and tiled onto the available desktop space in the 2D desktop environment.

Alternative to the 2D exposé mode, the user can also choose to enter a 3D stack mode. In the 3D stack mode, the 2D desktop plane is transformed into a 3D desktop space. The 2D graphical objects representing the open windows can be converted to corresponding 3D graphical objects and organized into one or more 3D browsable stacks in the 3D desktop space. Each stack includes the 3D graphical representations of open windows associated with a common value for a grouping property (e.g., application type). A respective graphical representation indicative of the value of the grouping property for each stack can be presented in proximity to the stack (e.g., above or below the stack), so that the user can quickly recognize and locate a desired group of open windows among the different groups of open windows.

In the 3D stack mode, each 3D stack of open windows can be browsed through one by one under the direction of the user. During the browsing, one window in the stack is rotated into a frontal view while all other windows in the stack are either kept in or restored to a side view. The window in the frontal view of a currently selected stack can become the current active window of the desktop. In addition to browsing, the user can also directly select an open window from one of the 3D browsable stacks shown in the 3D desktop space. The selected open window can be rotated and shown in the frontal view if it was not already shown in the frontal view. The selected window can become the current active window of the desktop.

In some implementations, when an open window in a selected 3D browsable stack enters the frontal view (e.g., by user browsing or by user selection), an application menu bar of the application providing the open window can be displayed at a designated menu location (e.g., under the desktop root menu bar) in the 3D desktop space. The application menu bar and the active window displayed in the 3D desktop together can provide the full range of interaction capabilities available within an application environment of the active window, even though all open windows of the desktop are still displayed in the 3D stack view.

In some implementations, when the user selects an open window from one of the 3D browsable stacks, the 3D desktop environment is automatically restored to the 2D desktop environment. The selected open window can be shown as the current active window of the 2D desktop environment, and the user can interact with the selected open window in the 2D desktop environment.

By grouping the open windows into groups and displaying each group of open windows in a respective 3D browsable stack, a large number of open windows can be organized into a smaller number of stacks. Since only one window in each stack is displayed in the frontal view at a time while all other windows are displayed in a side view, a large number of windows can be simultaneously visible within the limited desktop space. Therefore, the 3D stack view of the open windows as described herein can offer efficient use of display space to organize and present a large number of open windows.

The 3D stack view also allows the user to easily and quickly browse through the open windows, locate a window of interest, stop browsing at any time, and start working with the front window displayed in a currently selected stack without exiting the 3D stack view. The user can also stop working with the front window in the currently selected stack and resume browsing at any time without switching to a different display mode.

The 3D stack view of the open windows can be implemented at the window manager level of the operating system, rather than at the individual application level. A window manager communicating with the applications of the open window can be used to determine the layout and rendering of the three-dimensional desktop and the browsable stack of open windows. No special modifications to the application programs are necessary to implement the grouping of open windows, the browsing of the 3D browsable stacks, and the automatic update of the application-level menu bar displayed in the 3D desktop.

Exemplary User Interfaces for Presenting and Managing Open Windows

FIG. 1A illustrates an exemplary 2D desktop 100 presenting multiple open application windows.

In some implementations, 2D desktop 100 is depicted as a 2D background plane 102 on which graphical objects can be presented. For example, on the desktop plane 102, a number of icons (e.g., icons 103a-c) representing peripheral devices and file system folders, and a docking station for installed application programs (e.g., a dashboard 105) can be presented. The 2D desktop plane 102 has the appearance of being substantially co-planer or parallel to the display surface of an underlying hardware screen 104. When an application executing in the operating system environment generates a new window, the window can be displayed on top of the 2D desktop plane 102.

The open window of an application can be depicted as a 2D graphical object that can be moved laterally on the desktop plane 102. However, any movement in the direction normal to the desktop plane 102 is not enabled. In some implementations, the notion of depth in the direction normal to the desktop plane can only be reflected to a very limited degree from the appearance of overlap and relative obscuration between the open windows that are placed over the same area in the desktop plane 102.

In some implementations, the open windows can be rendered in a way to show a small thickness (e.g., by using shadowing or texture variations near the edges of the windows), and the open windows may demonstrate their relative display priorities in a virtual display stack when the open windows are rendered onto the desktop plane 102. However, the spatial arrangement of the entire desktop environment is nonetheless substantially two-dimensional due to the limitation in moving any portion of the open windows in a direction normal to desktop plane 102.

As shown in FIG. 1A, a number of open windows (e.g., windows 106, 108, 110, 112) provided by several different software applications are shown on the two-dimensional desktop plane 102. The open windows displayed on the desktop 102 are placed at various locations and can be moved by the user (e.g., by selecting and dragging the window using a pointing device). Some of the windows may also be resized (e.g., by clicking and dragging a corner of the window using a pointing device), such that the open windows can adopt different lateral dimensions. In FIG. 1A, some windows are only partially visible on the desktop plane 102, and some windows are completely obscured by other windows on top.

When the user selects an open window displayed on the desktop plane 102, the selected open window can obtain input focus, and become the current active window (in other words, the "top window") of the desktop environment. The user may begin interacting with the current active window using the user interface elements provided by the application of the current active window.

For example, the current active window of the two-dimensional desktop 100 is the window 106 of a web browser application. The window 106 can contain text and other content items (e.g., images, plug-ins, interactive forms, links, etc.) embedded in a webpage. The window 106 can also include various user interface elements provided by the web browser application associated with the window 106, such as an address input field, various web navigation controls, user setting controls, and various basic controls for manipulating the window graphical object (e.g., closing, minimizing, resizing, etc.). The user can interact with the web browser application through the user interface elements provided in the window 106.

In some implementations, when an open window receives input focus and becomes the top window of the desktop, the application providing the open window can also provide an application menu bar to accompany the open window. In some implementations, the application menu bar can be presented as part of the open window. Alternatively, the application menu bar can be provided and displayed at a designated location on the desktop plane 102 apart from the open window. The application menu bar can provide a more comprehensive set of commands and options in various cascading menus that are displayed when the user selects an item listed in the application menu bar.

For example, the application menu bar 114 currently displayed on the desktop plane 102 is provided by the application (e.g., the web browser application) of the current active window (e.g., the open window 106). The application menu bar 111 can be displayed under a desktop root menu bar 116 (e.g., a menu bar for controlling desktop-level or operating-system-level properties) at the top of the desktop plane 102, for example. In some implementations, other designated locations on the desktop plane 102 can be used to present the application menu bar, as well.

Displaying the application menu bar associated with a current active window at a designated menu location on the desktop plane 102 regardless of the current location and size of the current active window can provide consistency in the desktop environment. In addition, the user can freely arrange the open windows on the desktop plane to a desired configuration, and switch between the open windows, without spending the mental energy to keep track of the location of the different application menu bars. Furthermore, sometimes, an application window can be resized. By placing the application menu bar at a designated menu location apart from the application window, the size of the application menu bar no longer needs to be limited by the size of the window, and the size of the application menu bar does not need to compete and interfere with content placement within the window.

In some implementations, the application menu bar includes options and/or commands that cause additional windows to be opened on the desktop plane 102. In some implementations, an open window itself can include elements that cause new application windows to be generated when invoked. In some implementations, if a new window is opened, the newly opened application window can obtain input focus and become the top window of the desktop.

For example, when a user clicks on a link in the webpage displayed in the open window 106, a new window can be generated by the web browser application and presented on the desktop plane 102. The new window can become the top window of the desktop. For another example, the user may also select a menu item in the application menu bar 114 provided by the web browser application to open a new window on the desktop plane 102. The user can enter a web address in the address input field of the new window, and retrieve and display another webpage in the new window.

As in the above two examples, if the new active window is provided by the same application as the application providing the previous active window, the application menu bar presented at the designated location on the desktop plane 102 does not need to be altered. However, if the user opens a new application window (e.g., by launching a new application, opening a new file system folder, invokes a new desktop control interface, etc.) and the new application window is provided by a different application from the application providing the previous active window, then the application menu bar 114 displayed on the desktop plane 102 can be changed to the application menu bar of the new active window.

Alternatively, if the user does not open a new window, but selects an existing open window of another application on the desktop plane 102, the selected open window can become the current active window of the desktop. The application menu bar 114 can be updated to show the application menu bar provided by the application of the selected open window.

For example, suppose the user selects an open window 110 of a word processing application shown on the desktop plane 102. Upon user selection, the open window 110 can receive input focus and become the current active window of the desktop. The window 110 can be brought to the foreground of the desktop plane 102, and the previous active window 106 loses input focus, and recedes to the background of the desktop plane 102. In some implementations, visual effects showing the transition into the foreground and/or the background can be implemented (e.g., by animation or changes in color and shades of the windows as the windows go in and out of the foreground).

In some implementations, the application menu bar 114 displayed at the designated menu location of the desktop plane 102 can indicate the title or logo of the application that is providing the current active window. By indicating the title or logo of the application providing the current active application, the user can be provided with an additional visual cue for identifying the application program providing the current active window. This visual cue can be helpful to users in distinguishing applications that have similar top-level menu items and layouts. This visual cue is also helpful in indicating the changes in the application menu bar.

In some implementations, depending on when an open window is last accessed (e.g., selected or opened), a relative display priority can be associated with each open window in a desktop environment to form a virtual display stack. The display stack can be used to determine how to render the open windows in the desktop environment, such that the appearance of overlapping windows can reflect the order by which the open windows have been accessed previously.

For example, the open window that is most recently accessed can be assigned the top display priority among all open windows in the desktop and not obscured by any other open window that happens to be located over the same area of the desktop plane 102. As shown in FIG. 1A, the open window 106 has the highest display priority among all the open windows displayed in the desktop plane 102. The open window 108 has a lower display priority than the open window 106. Since the window 106 and the window 108 cover a common area in the desktop plane 102, the window 106 partially covers the window 108 over the common area.

If the user selects the open window 108 (e.g., by clicking on the area of the window 108 that is visible on the desktop plane 102), the display priority of the window 108 can be updated and the window 108 moved to the top of the display stack. The relative display priority between the window 106 and other windows can remain the same. The window 108 would now partially cover the window 106 over the common area.

As shown in FIG. 1A, multiple windows provided by multiple applications are displayed. As the user continues to launch new applications, open new windows from existing active applications, or select, move, and/or resize existing windows over a period of time, the desktop 102 can become cluttered with windows, and it can become difficult to locate a desired application window quickly. In addition, sometimes, a window can become completely obscured by other windows, making it difficult and time-consuming to locate.

In some implementations, the user can issue an input command that causes the 2D desktop to enter an exposé mode. In the exposé mode, all the open windows on the desktop can be scaled down and tiled onto the desktop plane 102, such that all open windows are simultaneously visible on the desktop plane 102. The scaled version of each open window can be a thumbnail image of the open window. The user can view the thumbnail images and determine which of the open windows that each thumbnail image represents. When the user selects a thumbnail image, the desktop can exit the exposé mode, and the open window represented by the selected thumbnail image can become the current active window of the desktop. The application menu bar 114 can be updated to show the application menu bar of the current active window.

In some implementations, alternative to the 2D exposé mode, the user can issue another input command (e.g., a particular keyboard combination, a particular touch-based gesture, selection of a designated desktop icon, etc.) to enter a 3D stack mode. In the 3D stack mode, the open windows are divided into one or more groups and each group of open windows are presented in a respective 3D browsable stack displayed in a 3D desktop space. The open windows in each browsable stack can be displayed in a frontal view one by one under the user's direction, while the other windows in the stack are kept in or restored to a side view.

In some implementations, the open windows in the 2D desktop environment are divided into different groups based on the respective value of a grouping property that is associated with each of the open windows. The grouping property can be defined in the operating system's window manager and/or specified by a user. Examples of the grouping property include an application type, a file type, a document owner, and so on. Other grouping properties are possible. In some implementations, the user is allowed to select a grouping property from several grouping properties provided by the operating system. In some implementations, the user is allowed to define a grouping property, and specify how the values for the grouping property can be determined for each open window.

The value of a grouping property associated with each open window can be determined, e.g., by a window manager of the operating system. For example, if the grouping property is application type, the value of the application type associated with each open window can be the name of the application program providing the open window. The open windows can be divided into different groups based on the application programs associated with the open windows, where each group includes open windows associated with and provided by the same application program.

In some implementations, each application type can be associated with multiple application programs. For example, the application types can include "communication programs," "word processing programs," "system programs," "multimedia programs," "Internet programs," and so on. Each application type can be associated with multiple application programs, and open windows provided by the multiple programs can be associated with the same application type. Therefore, the open windows associated with the same application type (e.g., "communication programs") can be included in the same group, even though they may be provided by several different applications (e.g., an internet phone application, an email application, and a chat application, etc.).

In another example, the grouping property can be a file type. For example, an application program can be used to open files of different formats or file types. Each file can be presented in a different open window provided by the application program. The open windows can be divided into different groups based on the file type associated with each window, and each group can include open windows displaying files of the same file type.

In another example, the grouping property can be a document owner associated with an open window. For example, the user may open multiple windows from an email program, and each open window can display an email message received from a respective sender. The sender associated with each email message can be considered as the document owner associated with the open window displaying the email message. Then open windows can be divided into different groups based on the senders of the email messages displayed in the open windows, and each group can include open windows showing email messages from the same sender. Other definitions of document owner are also possible.

By using an appropriate grouping property (e.g., application type, file type, etc.), the open windows presented in a 2D desktop can be divided into a number of groups, where each group only include a subset of all the open windows in the 2D desktop. The user can first locate the group of interest and then browse within the group of interest to locate the window of interest. This two-step process for locating a desired open window can be more efficient than moving the open windows around on the 2D desktop or browsing through all the open windows to locate an open window of interest, especially if there are a large number of open windows on the 2D desktop.

In addition, in some implementations, a user interface can be provided by the user to specify a desired grouping property that is used to divide the open windows into groups. The user can change the grouping property used to divide the open windows based on the kinds of open windows that have been opened at the time. Since the user is generally aware of the types of windows that have been opened, and the type of open windows that he or she wishes to locate, the user can choose the grouping property that best separates out the type of windows of interest from the rest of the open windows. The grouping properties that can be used to group the open windows can be highly customizable, and values of a user-defined grouping property can be specified for the open windows by a user. Therefore, the user can create convenient ways to categorize the open windows based on his or her particular operation needs and improve his or her operation efficiency.

After the open windows displayed on a 2D desktop are grouped according to the values of a grouping property associated with the open windows, the 2D desktop can be transformed into a 3D desktop. The 2D graphical representations of the open windows can be transformed into corresponding 3D graphical representations of the open windows. A respective 3D browsable stack can be created for each group of open windows in the 3D desktop space, where each 3D browsable stack includes the 3D graphical representations of the open windows in the group associated with the 3D browsable stack.

In some implementations, the 3D graphical representation of each open window resembles the 2D graphical representation of the open window, such that the user can still recognize the open window based on the appearance of the window's 3D graphical representation. In each 3D browsable stack, only the 3D graphical representation of one window is presented in a frontal view, while the 3D graphical representations of all other windows in the stack are presented in a side view. The user can enter a browsing input (e.g., using an arrow key on the keyboard, using a mouse pointer hovering over a particular portion of a 3D browsable stack, or using a directional gesture on a touch-sensitive surface over a 3D browsable stack, etc.) indicating a desired direction in which the browsable stack should be cycled through to present the open windows in the frontal view one by one.

As the open windows in a currently selected browsable stack are being rotated into the frontal view one by one under the user's direction, the open window entering the frontal view in the selected browsable stack is transitioned from an inactive state to an active state. Similarly, each open window that is rotated back into the side view is transitioned from the active state back into the inactive state. In some implementations, the user's browsing input can also dictate the speed by which the browsable stack of open windows are cycled through one by one. For example, a more exaggerated or faster swiping gesture on a touch-sensitive surface can indicate a faster browsing speed.

Figure 1B:
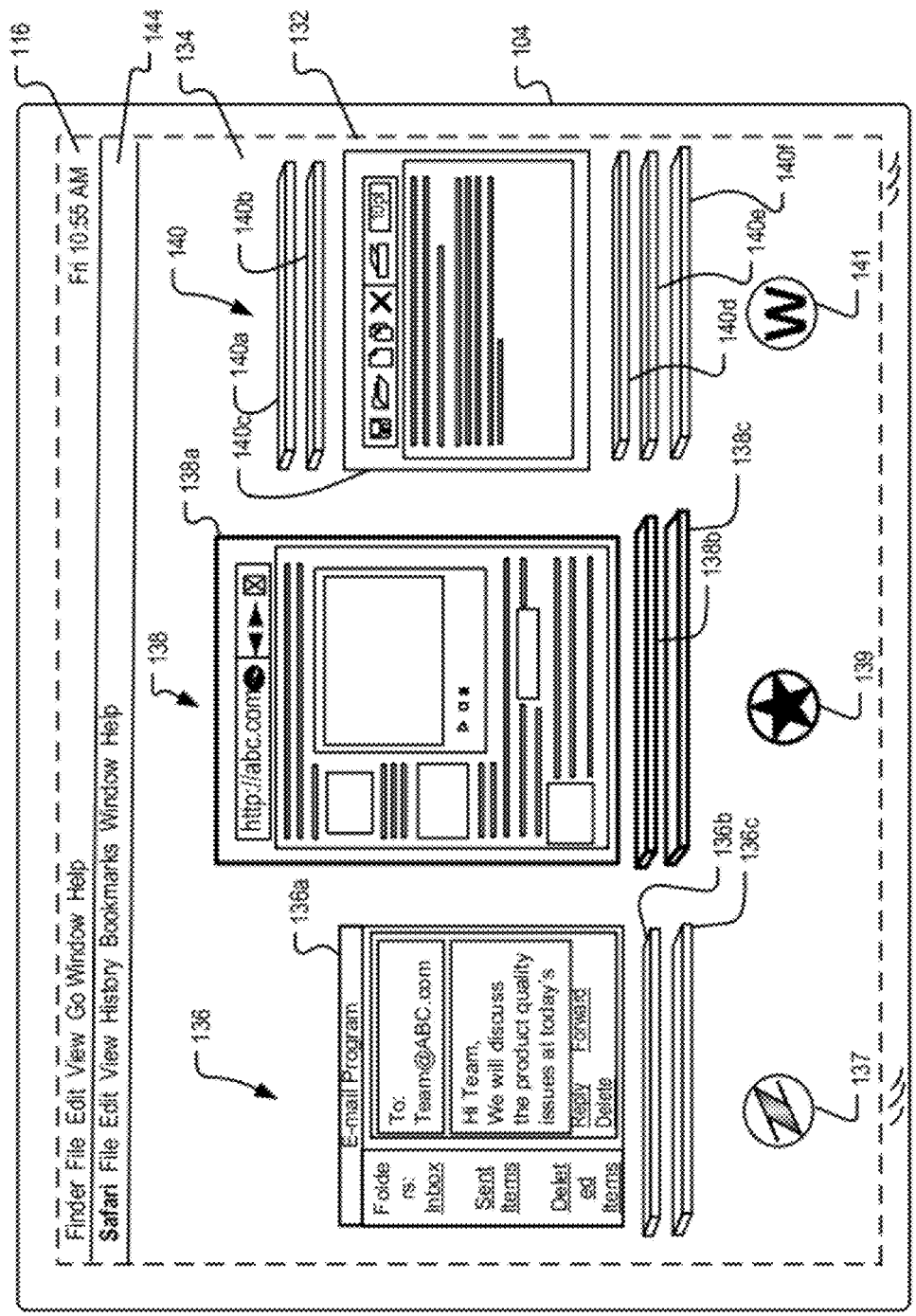
FIG. 1B illustrates an exemplary 3D desktop showing multiple 3D browsable stacks of open windows.

FIG. 1B illustrates an exemplary 3D desktop 132 in which open windows are presented in multiple 3D browsable stacks.

As shown in FIG. 1B, the 3D desktop 132 includes a 3D desktop space 134, instead of a 2D desktop plane 102. The 3D desktop space 134 includes three 3D browsable stacks (e.g., stacks 136, 138, and 140). More and fewer 3D browsable stacks may be presented depending on the number of window groups that are created from the open windows present on the 2D desktop.

Each 3D browsable stack includes the 3D graphical representations of open windows in a group associated with the 3D browsable stack. Although the 3D graphical objects representing the open windows are still essentially flat (e.g., having a small thickness relative to width and height of the window), spatial placement and movement of the 3D window graphic objects are no longer restricted in a 2D desktop plane substantially coplanar or parallel to the surface of the display screen 104.

For example, as shown in FIG. 1B, the 3D desktop space 134 can include a common ground plane on which each 3D browsable stack can be placed. The common ground plane can extend horizontally across and into the three-dimensional desktop space 134. The common ground plane can provide a common baseline for neatly organizing the different stacks of open windows in the 3D desktop space 134.

In some implementations, one open window in each of the stacks (e.g., stacks 136, 138, and 140) is shown in a frontal view, while all other open windows shown in the stack can be rotated by an angle about a respective axis parallel to the ground plane. These other windows are turned sideways and presented in a side view. For example, in the stack 136, window 136a is shown in the frontal view, while windows 136b and 136c are shown in the side view. In the stack 138, window 138a is shown in the frontal view, while windows 138b and 138c are shown in the side view. In the stack 140, window 140c is shown in the frontal view, while windows 140a, 140b, 140d, 140e, and 140f are shown in the side view. By presenting all but one open window in each stack in the side view, more windows can be displayed within the limited space occupied by each 3D browsable stack in the 3D desktop space 134.

In some implementations, each open window in the 3D stacks can be scaled by a different factor such that all open windows can have a uniform size. By scaling the open windows to a uniform size, the organization and positioning of the browsable stacks can have a neat appearance. In some implementations, each open window in the stacks can be scaled by the same factor such that the relative sizes of the windows remain constant. By maintaining the relative sizes of the windows, an additional visual cue can be provided to users to recognize an open window from the browsable stacks.

In some implementations, when transitioning from the 2D desktop (e.g., the desktop 100 shown in FIG. 1A) to a 3D desktop in the browsable stack view (e.g., the desktop 132 shown in FIG. 1B), the representations of the open windows in the 2D desktop and the 3D desktop can be interpolated, such that animations showing a smooth transition between the 2D desktop to the 3D desktop can be presented. The current active window (e.g., the window 106) in the 2D desktop space can be transformed into the current active window (e.g., the window 138a) displayed in a frontal view in a currently selected stack (e.g., highlighted stack 138) of the 3D desktop.

In some implementations, when transitioning between the 2D desktop and the 3D desktop, the order of the open windows in each browsable stack (e.g., browsable stack 136, 138, or 140) can be based on the relative display priority of the open windows in the display stack of the 2D desktop. For example, the open window having the highest display priority among the open windows in each browsable stack can be placed into the frontal view at the top of the browsable stack upon completion of the transition. The rest of the open windows in the stack can be placed into the side view below the top open window in the browsable stack.

In some implementations, the user can invoke another input command to return to the 2D desktop from the 3D browsable stack view. When the user returns to the 2D desktop, the reverse animation sequence can be performed to convert the 3D desktop space back into the 2D desktop plane. Each window can be displayed at a corresponding location on the 2D desktop plane, e.g., at their original locations. The windows can be rendered according to their updated display priority in the display stack. In some implementations, if the user has interacted with some or all windows while in the 3D browsable stack view, the number and/or order of the open windows in the display stack may have been altered. The windows can be displayed according to the updated display stack when rendering the 2D desktop.

In some implementations, a respective graphical representation indicative of the value of the grouping property associated with each group of open windows can be presented on the desktop in proximity to (e.g., below or above) the 3D browsable stack associated with the group. For example, as shown in FIG. 1B, the grouping property being used is application type, and open windows provided by the same application program are grouped together and presented in one stack. As shown in FIG. 1B, the 3D browsable stack 136 includes open windows provided by an email application. The 3D browsable stack 138 includes open windows provided by a web browser application. The 3D browsable stack 140 includes open windows provided by a word processing application. In some implementations, an icon of the application program providing the open windows in each 3D browsable stack can be used as the graphical representation indicative of the value of the grouping property (e.g., the application type). For example, as shown in FIG. 1B, icon 137 is used to represent the email application, icon 139 is used to represent the web browser application, and icon 141 is used to represent the word processing application. In some implementations, the application icon can be enlarged so that it is prominent and easy to see on the desktop.

In some implementations, the graphical representation indicative of the value of the grouping property associated with each group of open windows can be specified by the user. For example, if a user-specified grouping property is a document owner property. The user can associate a name or picture with each possible document owner. When open windows associated with a comment document owner are displayed in a 3D browsable stack, the name and/or picture of the common document owner can be presented in proximity to the 3D browsable stack.

In some implementations, when the 2D desktop plane is transformed into the 3D desktop space, the top window shown in the 2D desktop is placed into a 3D browsable stack in the 3D desktop space. The top window remains as the current active window of the desktop and becomes the first open window shown in a frontal view in the stack. In addition, the 3D browsable stack also becomes the currently selected stack among all the stacks shown in the 3D desktop space. For example, as shown in FIG. 1B, the 3D browsable stack 138 presents the current active window of the desktop (e.g., the window 138a) in a frontal view, and the 3D browsable stack 138 is the currently selected stack in the 3D desktop space and maintains input focus. In some implementations, visual indication is provided to highlight the currently selected 3D browsable stack in the 3D desktop. For example, the currently selected stack may be visually enhanced while the other stacks are visually diminished (e.g., faded, shrunken, etc.).

In some implementations, the user can select and shift the input focus from a currently selected stack to a different stack shown in the 3D desktop. For example, by using the scrolling function of a pointing device or keyboard input device, the user can shift the input focus to the next stack in the scrolling direction (e.g., to the left or to the right of the currently selected stack) that is presented in the 3D desktop. For another example, by hovering a pointing device over a different stack in the 3D desktop, the input focus can be shifted to the different stack from the currently selected stack. In some implementations, if many stacks are formed, not all stacks that are created need to be simultaneously present on the display. When the user scrolls through the desktop in either direction, the hidden stacks can be revealed on the display one by one.

In some implementations, the user can browse through the open windows in a selected stack one by one. For example, as shown in FIG. 1B, the currently selected stack is the stack 138. The user can scroll through the open windows in the stack 138 by using a scrolling function provided by an input device (e.g., a wheeled pointing device, the up-down arrow keys on a keyboard, or a swiping finger on a touch-sensitive surface). The scrolling input can cause the open windows in the selected stack to flip into an upright position and shown in a frontal view one by one in an order determined by the scrolling direction.

In some implementations, the user can provide a hovering input over a portion of the stack 138, and cause the open windows in the stack 138 to be cycled through into the front view one by one in a selected direction. For example, when the hovering event is detected over an upper portion of the selected stack, the open windows are flipped into the upright position and shown in the front view one by one in an order going down the stack. Alternatively, when the hovering event is detected over a lower portion of the selected stack, the open windows are flipped into the upright position and shown in the frontal view one by one in an order going up the stack.

As shown in FIG. 1B, the currently selected stack is the stack 138, and the current active window in the desktop is the window 138a shown in the frontal view. When a pointing device is hovered over the lower portion of the stack 138, the window 138a is rotated about an axis parallel to the group plane and falls back into a horizontal position and presented in a side view. The next window 138b below the window 138 in turn can be rotated about an axis parallel to the ground plane into an upright position and presented in the frontal view. Now, the window 138b becomes the front window of the stack 138 and the current active window of the desktop.

If the pointing device continues to hover over the same portion of the stack 138, the window 138b will be rotated into a horizontal position and presented in the side view again, while the next window 138c below the window 138b can be rotated into the upright position and presented in the frontal view. If the pointing device is now hovered over an upper portion of the stack 138, the open windows in the stack will be cycled through and presented in the frontal view one by one in an order going up the stack.

Figure 1C:
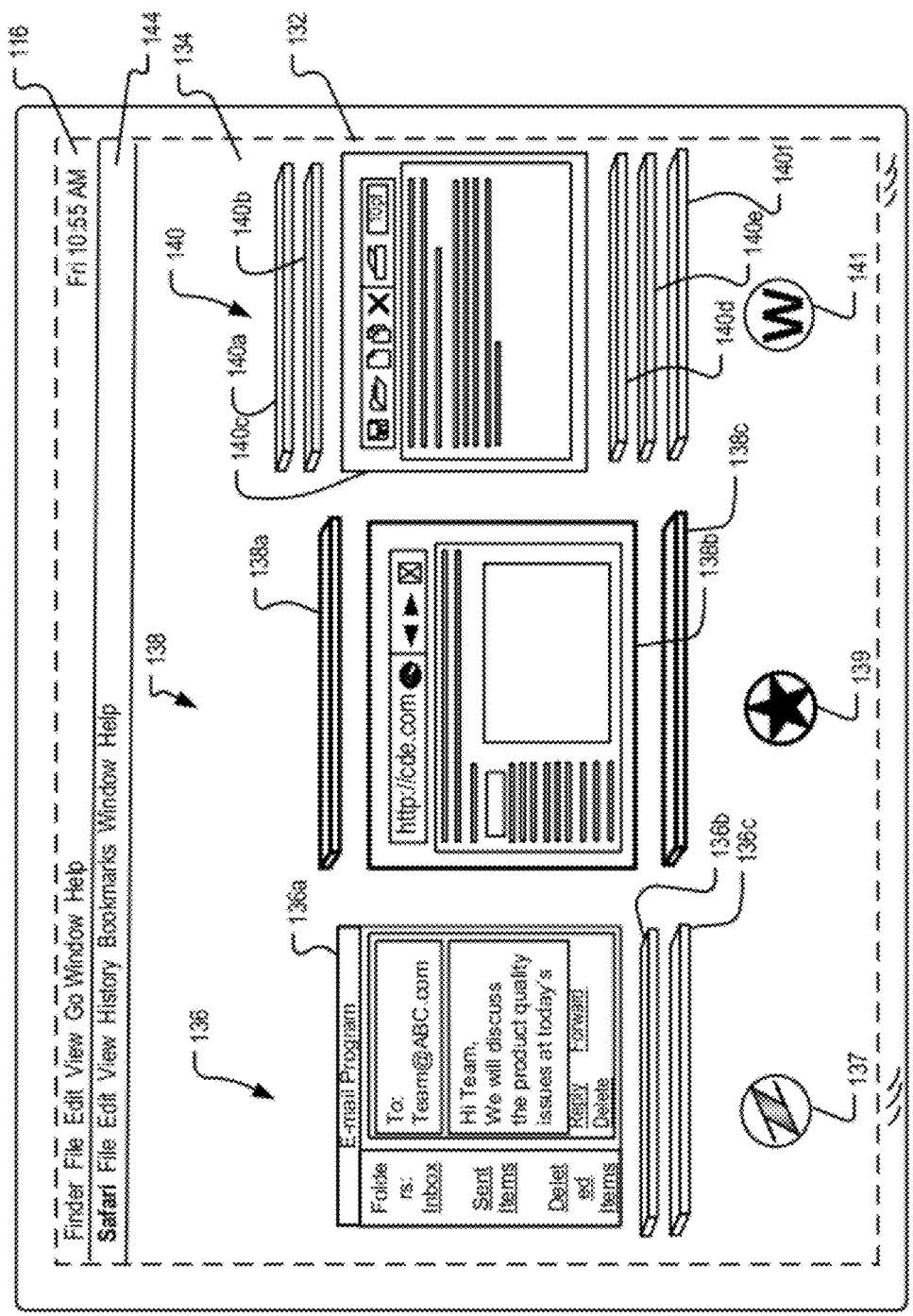
FIG. 1C illustrates the browsing of a selected 3D browsable stack shown in FIG. 1B.

FIG. 1C illustrates an exemplary configuration that would result from the above browsing. After the browsing input has been received from the user, e.g., from a pointing device hovering over a portion of the selected stack 138 or from scrolling function keys of a keyword, the original frontal window 138a is rotated into the horizontal position and presented in a side view, while the next window 138b is rotated into the upright position and presented in the frontal view.

At any time during the browsing (e.g., while the open windows are being cycled through into the frontal view), the user can issue a designated input command to select the current front window (e.g., the window 138b) of the stack and stop the browsing. The selected front window (e.g., the window 138b) of the selected stack (e.g., the stack 138) can become the active window of the desktop.

In some implementations, the user may begin interacting with the content of the current active window (e.g., the window 138b) using the user interface elements provided by the application of the current active window without leaving the 3D stack view. For example, the user may scroll the content of the webpage in the window 138b, click on links in the webpage, play a video in the embedded video player, and so on, in the window 138b.

In addition, the user may use the application menu bar 144 displayed in the designated menu location of the 3D desktop to locate previously visited webpages, go to a bookmarked webpage, to view the source code of the webpage, to view other open windows of the web browser application, and so on, by selecting the appropriate menu items in the application menu bar 144.

In some implementations, instead of browsing through the open windows in a selected stack, the user can select an open window that is presented in the side view directly. For example, the user can move the pointing device to a window in a side view and select the window in the side view directly before the window is rotated into the frontal view during the browsing through the stack. In some implementations, the selection of open windows can be made in any stack displayed in the 3D desktop space. For example, the user can select a window 140d in the stack 140 directly (e.g., by clicking on it using a pointing device) without cycling through the open windows by a browsing input command.

Figure 1D:
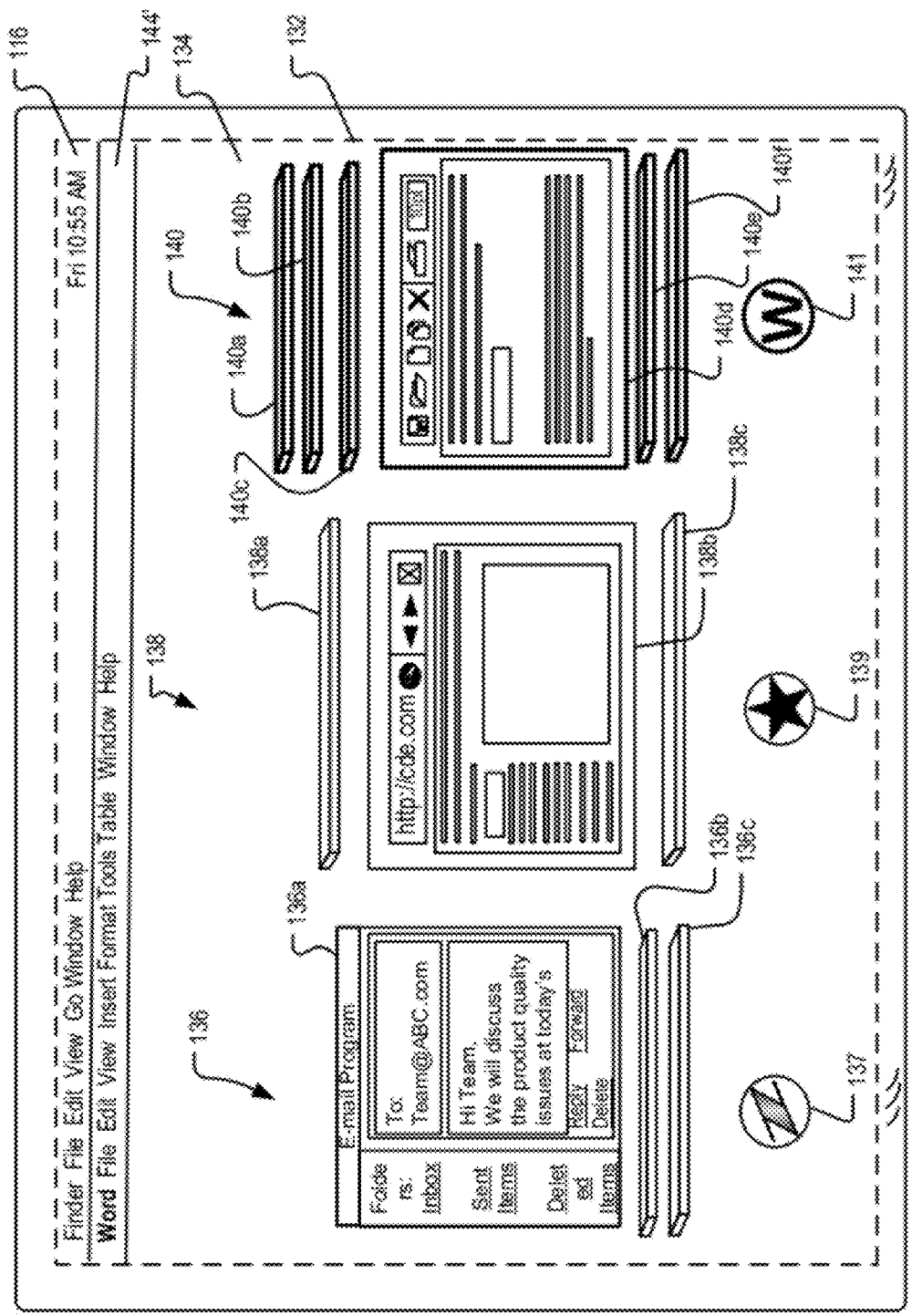
FIG. 1D illustrates the selection of an open window from a 3D browsable stack shown in FIG. 1B.

In some implementations, as shown in FIG. 1D, the selected window (e.g., the window 140d) can be rotated into the frontal view (e.g., if it was previously in the side view) and becomes the top window of the stack. In addition, the selected window (e.g., the window 140d) also becomes the current active window of the desktop. In some implementations, the user may begin interacting with the content of the current active window (e.g., the window 140d) using the user interface elements provided by the application of the current active window without leaving the 3D stack view. For example, in this example, the window 140d is provided by a word processing application, and the user may begin entering text, change format of the entered text, copy and paste content within the document being processed, and so on.

In some implementations, where the grouping property is application type, each stack includes open windows provided by the same application, and open windows provided by different applications are included in different 3D browsable stacks. When the user has selected a different stack or an open window in a different stack from the currently selected stack, the application menu bar displayed at a designated menu location of the desktop can be updated to show the application menu bar of the application providing the currently selected open window.

For example, when the user selected the open window 140d from the desktop shown in FIG. 1C, the application menu bar 144 is updated to application menu bar 144'. The application menu bar 144' is the application menu bar of the word processing application of the currently selected open window 140d. The user can start interacting with the open window 140*d* shown in FIG. 1D using the user interface elements provided in the open window 140*d*, and the application menu bar 144' presented at the designated menu location of the desktop. The open window 140*b* in conjunction with the application menu bar 144' can provide the full-range of interaction capabilities that are conventionally available to the user in the application environment of the window 140*d*. For example, the user may start entering text, altering the format of the text, opening a new document, performing a spell check, and so on using the user interface elements of the window 140*d* and the menu items of the application menu bar 144'.

In some implementations, the application menu bar 144 displayed at the designated menu location of the three-dimensional desktop space 134 can indicate the title or logo of the application that provided the current active window. By indicating the title or logo of the application providing the current active window, the user can be provided an additional visual cue for identifying the application program providing the current active window. This visual cue can help users distinguish between applications that have similar top-level menu items and layouts. This visual cue also helps indicate the changes in the application menu bar.

In some implementations, when the grouping property is not application type, open windows in each stack can be provided by different application programs. In such a scenario, the application menu bar displayed at the designated location of the desktop can be updated according to the application menu bar of the application providing the currently selected open window in a currently selected stack. For example, as shown in FIG. 1D, the open window 140*d* shown in FIG. 1D and the window 138*b* shown in FIG. 1C are provided by two different application programs, and the desktop menu bar 144 presented at the designated menu location can be updated to the application menu bar of the application providing the current active window of the desktop.

Figure 1E:
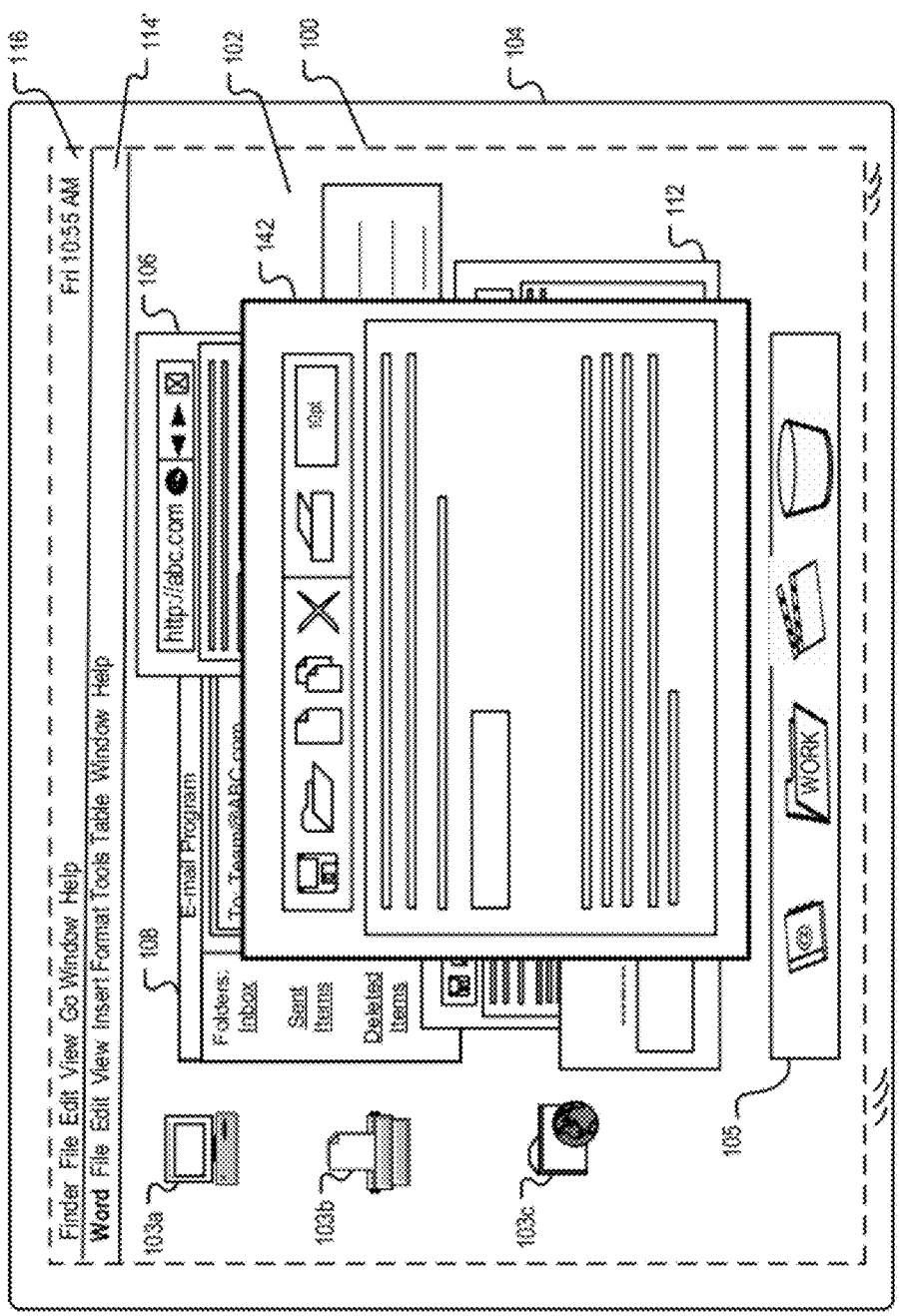
FIG. 1E illustrates the restoration of a 2D desktop from the 3D desktop shown in FIG. 1B after the selection of an open window from a 3D browsable stack shown in FIG. 1D.

In some implementations, when the user has selected an open window in the browsable stack, the selected open window is presented in a frontal view and the user can start interacting with the open window without exiting the 3D stack view. In some implementations, after the user has selected an open window in the browsable stack, the 3D desktop can be restored back to the 2D desktop, as shown in FIG. 1E, and the selected open window can become the current active window (e.g., the window 142) of the 2D desktop. The other windows in the browsable stacks can be returned to their original locations on the 2D desktop before the transformation to the 3D desktop had occurred.

Restoring the 2D desktop environment after the user has selected an open window in a 3D browsable stack allows the selected open window to be presented in a larger view, where the selected open window is allowed to obscure other windows on the desktop. The larger view can make it easier for the user to see and interact with the selected window and the content of the selected window.

Exemplary Processes for Presenting and Managing Open Windows

FIGS. 2-8 are exemplary processes for presenting and managing desktops and open windows as described above with respect to FIGS. 1A-1E. The processes can include steps for implementing various aspects of the user interfaces and functionalities described with respect to FIGS. 1A-1E. Different combinations and subcombinations of the various aspects are possible.

Figure 2:
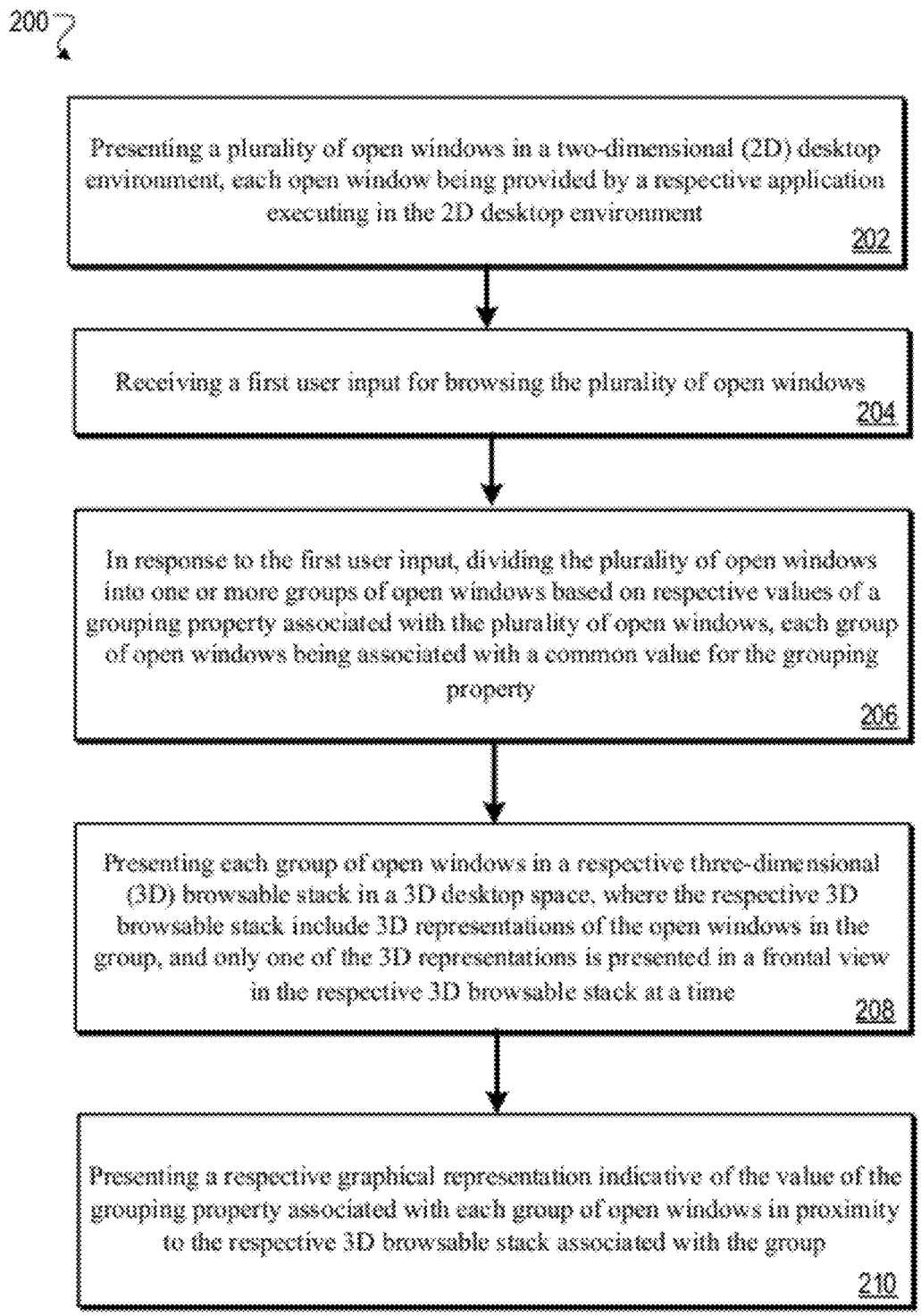
FIG. 2 is flow diagram of an exemplary process for presenting one or more 3D browsable stacks of open windows in a 3D desktop environment.

FIG. 2 is a flow diagram of an exemplary process 200 for presenting one or more 3D browsable stacks of open windows in a 3D desktop environment.

In the process 200, a plurality of open windows can be presented in a two-dimensional (2D) desktop environment (202). Each open window can be provided by a respective application executing in the 2D desktop environment. A first user input for browsing the plurality of open windows can be received (204). In response to the first user input, the plurality of open windows can be divided into one or more groups of open windows based on respective values of a grouping property associated with the plurality of open windows, where each group of open windows are associated with a common value for the grouping property (206). Then, each group of open windows can be presented in a respective three-dimensional (3D) browsable stack in a 3D desktop space (208). The respective 3D browsable stack includes 3D representations of the open windows in the group, and only one of the 3D representations is presented in a frontal view in the respective 3D browsable stack at a time.

In some implementations, the grouping property is an application type associated with the open windows, and each group of open windows include the open windows provided by a common application executing in the 2D desktop environment.

In some implementations, a respective graphical representation indicative of the value of the grouping property associated with each group of open windows can be presented in proximity to the respective 3D browsable stack associated with the group (210).

In some implementations, the grouping property is an application type associated with the open windows, and the graphical representation indicative of the value of the grouping property associated with each group of windows is an enlarged icon for the respective application providing the open windows in the group.

Figure 3:
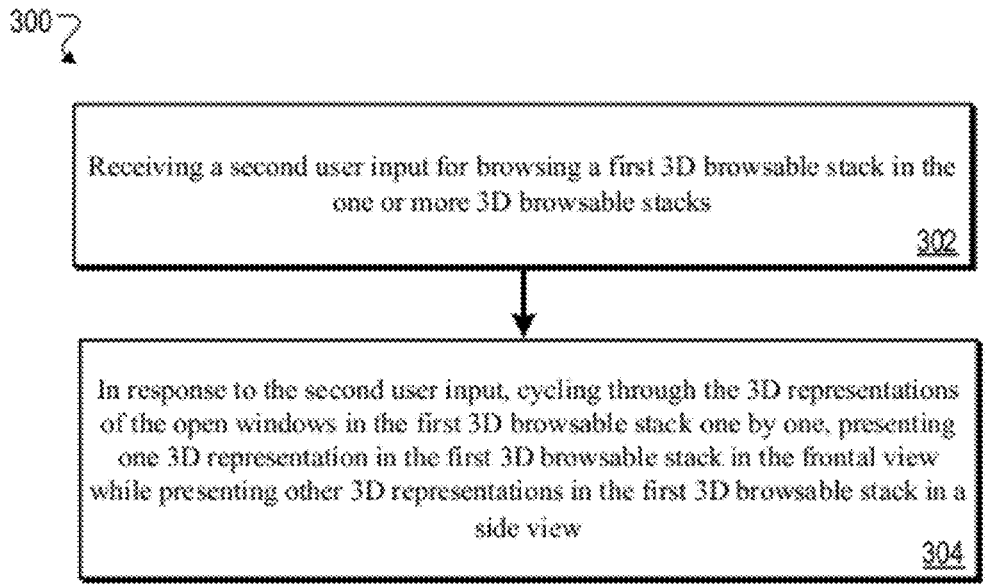
FIG. 3 is a flow diagram of an exemplary process for browsing through a selected 3D browsable stack of open windows.

FIG. 3 is a flow diagram of an exemplary process 300 for browsing through a selected 3D browsable stack of open windows.

In the process 300, a second user input for browsing a first 3D browsable stack in the one or more 3D browsable stacks can be received (302). In response to the second user input, the 3D representations of the open windows in the first 3D browsable stack can be cycled through one by one, where one 3D representation in the first 3D browsable stack is presented in the frontal view while other 3D representations in the first 3D browsable stack are presented in a side view (304).

Figure 4:
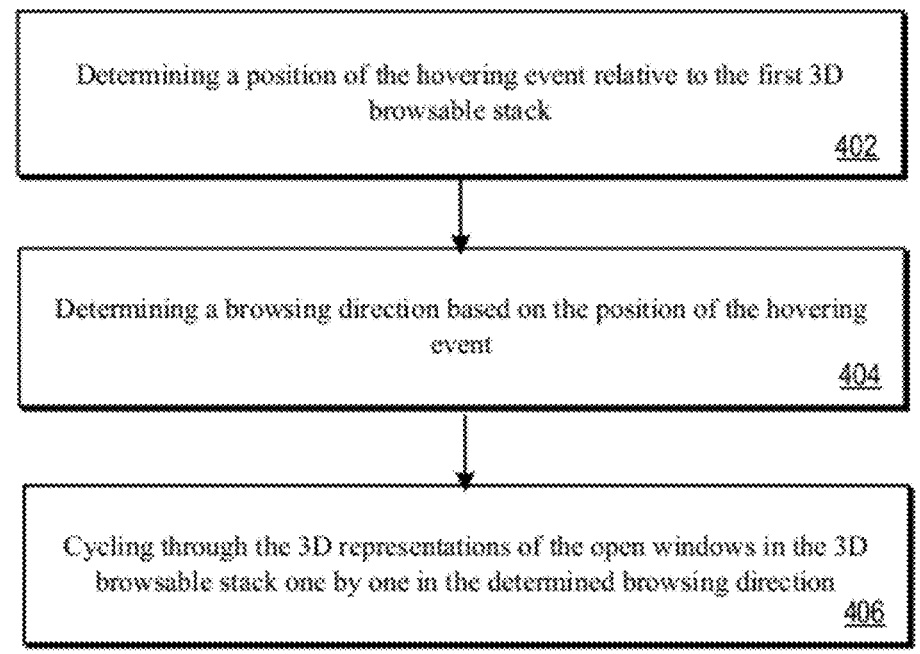
FIG. 4 is a flow diagram of an exemplary process for cycling through a stack of open windows based on a detected hovering input event.

FIG. 4 is a flow diagram of an exemplary process 400 for cycling through a stack of open windows based on a detected hovering input event.

In some implementations, the user input for browsing the 3D browsable stack is a hovering event by a pointing device detected over the first 3D browsable stack. When cycling through the 3D representations of the open windows in the first 3D browsable stack one by one, a position of the hovering event relative to the first 3D browsable stack can be determined (402). Then, a browsing direction can be determined based on the position of the hovering event (404). Then, the 3D representations of the open windows in the 3D browsable stack can be cycled through one by one in the determined browsing direction (406).

Figure 5:
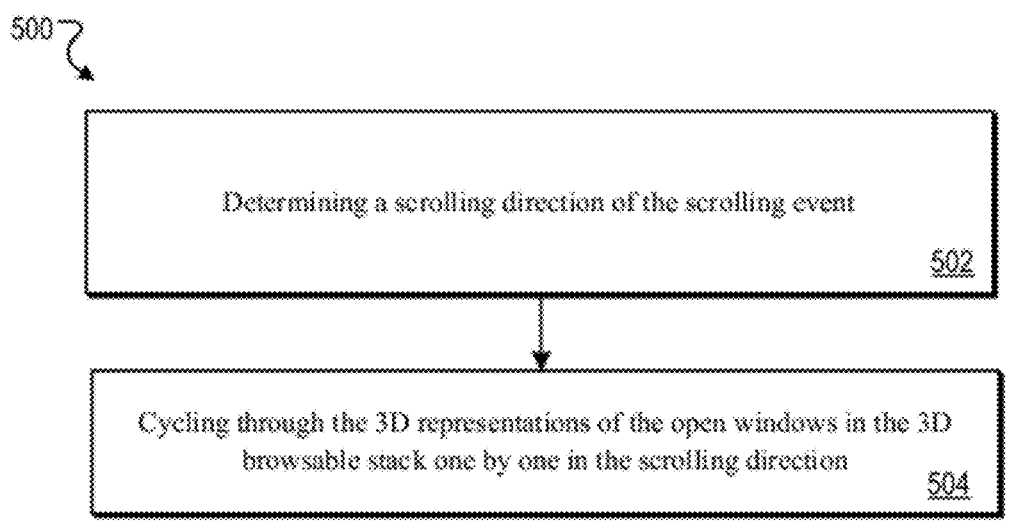
FIG. 5 is a flow diagram of an exemplary process for cycling through a stack of open windows based on a detected scrolling input event.

FIG. 5 is a flow diagram of an exemplary process 500 for cycling through a stack of open windows based on a detected scrolling input event.

In some implementations, the user input for browsing the stack is a scrolling event received from an input device. When cycling through the 3D representations of the open windows in the first 3D browsable stack one by one, first, a scrolling direction of the scrolling event can be determined (502). Then, the 3D representations of the open windows in the 3D browsable stack can be cycled through one by one in the scrolling direction (504).

Figure 6:
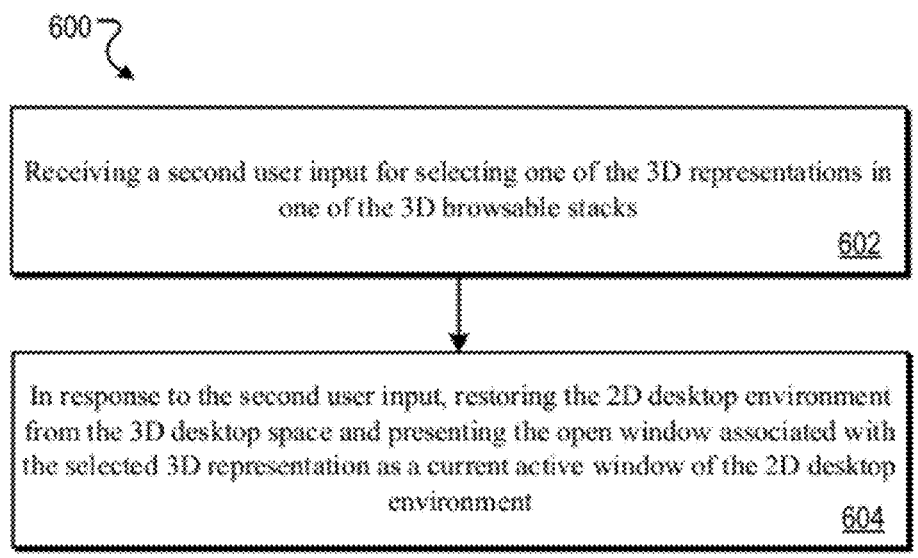
FIG. 6 is a flow diagram of an exemplary process for restoring a 2D desktop environment from a 3D desktop environment showing the 3D browsable stacks.

FIG. 6 is a flow diagram of an exemplary process 600 for restoring a 2D desktop environment from a 3D desktop environment after selection of an open window in a 3D browsable stack shown in the 3D desktop environment.

In the process 600, a user input for selecting one of the 3D representations in one of the 3D browsable stacks can be received (602). In response to the second user input, the 2D desktop environment can be restored from the 3D desktop space and the open window associated with the selected 3D representation can be presented as a current active window of the 2D desktop environment (604).

Figure 7:
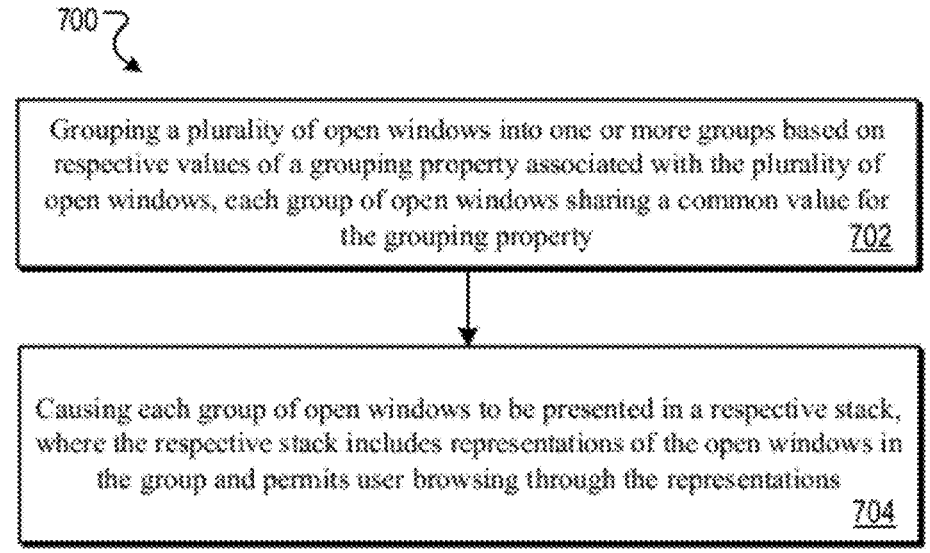
FIG. 7 is flow diagram of another exemplary process for presenting one or more 3D browsable stacks of open windows in a 3D desktop environment.

FIG. 7 is a flow diagram of an exemplary process 700 for presenting one or more 3D browsable stacks of open windows in a 3D desktop environment.

In the example process 700, the operating system can group a plurality of open windows into one or more groups based on respective values of a grouping property associated with the plurality of open windows, each group of open windows sharing a common value for the grouping property (702). The operating system can cause each group of open windows to be presented in a respective stack, where the respective stack includes representations of the open windows in the group and permits user browsing through the representations (704).

In some implementations, the operating system can present the plurality of open windows in a two-dimensional (2D) desktop environment. While the open windows are presented in the 2D desktop environment, the operating system can detect an input for browsing the plurality of open windows, where the groups of open windows are presented in the groups' respective stacks in response to the detecting, and the respective stacks are presented in a three-dimensional (3D) desktop environment.

In some implementations, the grouping property is an application type associated with the open windows, and each group of open windows include the open windows provided by a common application executing in the 2D desktop environment.

In some implementations, the operating system can present a respective graphical representation indicative of the value of the grouping property associated with each group of open windows in proximity to the stack associated with the group.

In some implementations, the operating system can detect an input for browsing a first stack including a first group of open windows. In response to the detecting, the operating system can cycle through the representations of the open windows in the first stack one by one, presenting one representation in a first view while keeping other representations in the first stack in a second view.

In some implementations, the input is a hovering event by a pointing device over the first stack.

In some implementations, when cycling through the representations of the open windows in the first stack, the operating system can determine a position of the hovering event relative to the first stack, determining a browsing direction based on the position of the hovering event; and cycling through the representations of the open windows in the stack in the determined browsing direction.

In some implementations, the input is a scrolling event received from an input device. When cycling through the representations of the open windows in the first stack, the operating system can determine a scrolling direction of the scrolling event and cycle through the representations of the open windows in the stack in the scrolling direction.

Figure 8:
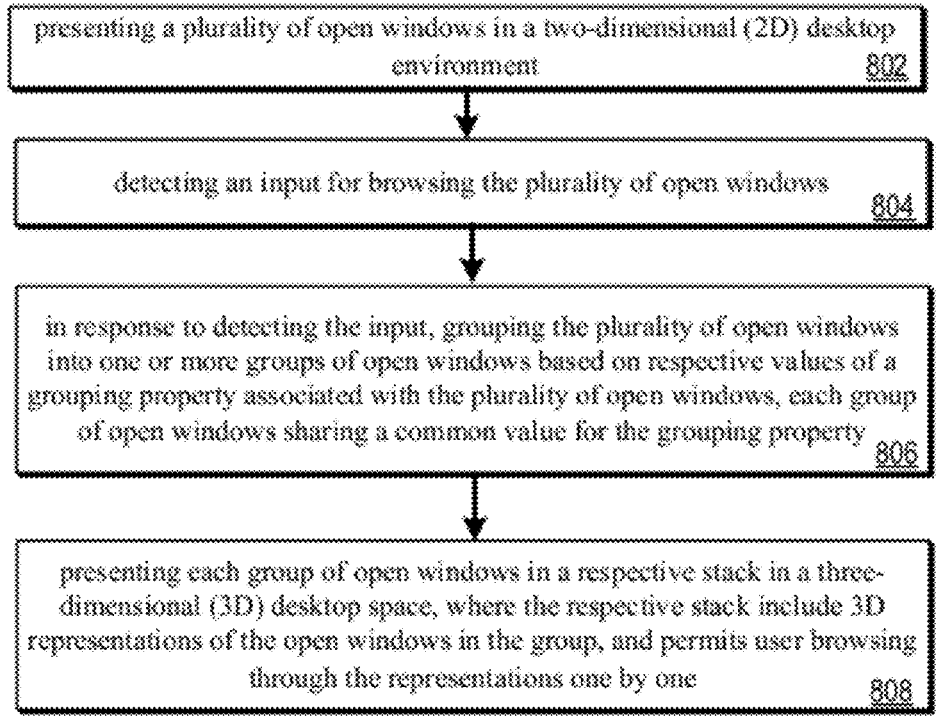
FIG. 8 is flow diagram of another exemplary process for presenting one or more 3D browsable stacks of open windows in a 3D desktop environment.

FIG. 8 is a flow diagram of an exemplary process 800 for presenting one or more 3D browsable stacks of open windows in a 3D desktop environment.

In the example process 800, the operating system can present a plurality of open windows in a two-dimensional (2D) desktop environment. The operating system can detect an input for browsing the plurality of open windows. In response to detecting the input, the operating system can group the plurality of open windows into one or more groups of open windows based on respective values of a grouping property associated with the plurality of open windows, each group of open windows sharing a common value for the grouping property. The operating system can then present each group of open windows in a respective stack in a three-dimensional (3D) desktop space, where the respective stack includes 3D representations of the open windows in the group, and permits user browsing through the representations one by one.

Other processes implementing one or more aspects of the user interfaces and functionalities described with respect to FIGS. 1A-1E are possible.

Exemplary Computing Devices

Figure 9:
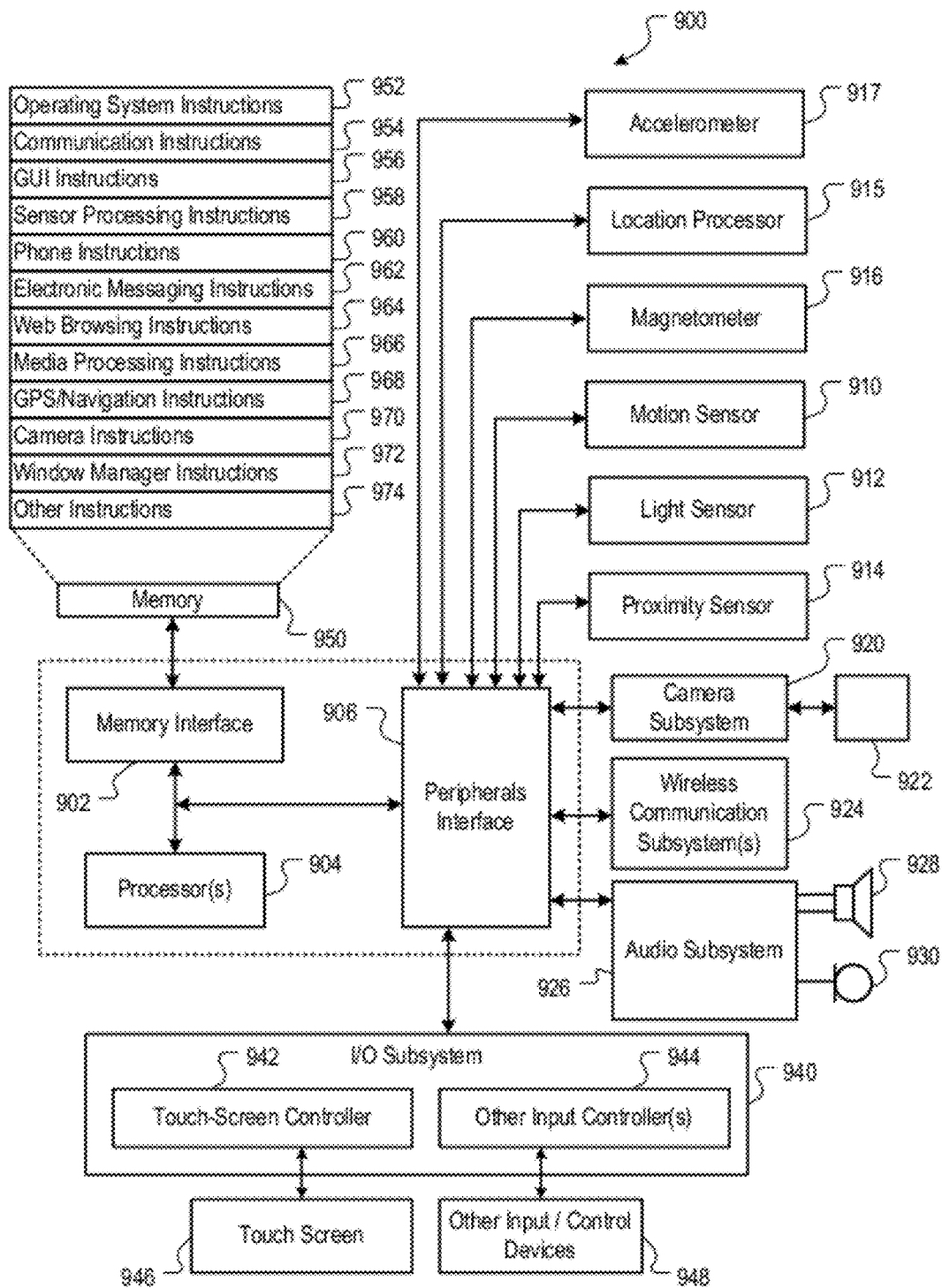
FIG. 9 is a block diagram of exemplary hardware architecture for implementing the features and processes described in reference to FIGS. 1A-8.

FIG. 9 is a block diagram of an exemplary hardware architecture 900 for implementing the features and processes described in reference to FIGS. 1A-8. Although the architecture shown is for a mobile device (e.g., smart phone, electronic tablet, game device, etc.), the processes and features described in reference to FIGS. 1A-8 can also be implemented by other architectures, including but not limited to: desktop and server computers, game consoles, televisions, etc. For example, all or some of the user interfaces disclosed can be presented by a server computer on a network as web pages. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a WiFi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/ control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing, such as the user interfaces illustrated in FIGS. 1A-1E; sensor processing instructions 958 to facilitate sensor-related processing and functions; phone instructions 960 to facilitate phone-related processes and functions; electronic messaging instructions 962 to facilitate electronic-messaging related processes and functions, such as SMS and MMS; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web shopping instructions to facilitate web shopping-related processes and functions.

Memory 950 can include window manager instructions 972 for implementing a window manager for further implementing the features, user interfaces, and processes described in reference to FIGS. 1A-6. The window manager 972 can interact with or be part of the graphical user interface instructions 956. Memory 950 can also include other instructions 974 for implementing other functionalities.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method performed by one or more processors of a device, comprising:
presenting a plurality of open windows at various locations in a first desktop environment;
while the open windows are presented in the first desktop environment, detecting an input to enter a second desktop environment;
in response to detecting the input to enter the second desktop environment, transforming the first desktop environment into the second desktop environment by:
determining respective values of a grouping property associated with the plurality of open windows;
grouping the plurality of open windows into a plurality of groups in response to determining the respective values of the grouping property associated with the plurality of open windows, each group of open windows sharing a common value for the grouping property; and
causing each group of open windows to be presented in a respective stack adjacent another respective stack, where the respective stack includes representations of the open windows in the group and permits user browsing through the representations;
replacing the plurality of open windows at various locations with the plurality of groups;
while in the second desktop environment:
detecting a selection of an open window in a group, wherein the open window corresponds to a user interface of a computer software application associated with a menu bar for user interaction with the computer software application;
displaying the selected open window in a frontal view in a first region; and
displaying, in a second region that is separate from the first region, the menu bar associated with the computer software application with which the open window is associated.

2. The method of claim 1, wherein the grouping property is an application type associated with the open windows, and each group of open windows include the open windows provided by a common application executing in the first desktop environment.

3. The method of claim 1, further comprising:
presenting a respective graphical representation indicative of the value of the grouping property associated with each group of open windows in proximity to the stack associated with the group.

4. The method of claim 1, further comprising:
detecting an input for browsing a first stack including a first group of open windows; and
in response to the detecting, cycling through the representations of the open windows in the first stack one by one, presenting one representation in a first view while keeping other representations in the first stack in a second view.

5. The method of claim 4, wherein the input is a hovering event by a pointing device over the first stack.

6. The method of claim 5, wherein cycling through the representations of the open windows in the first stack further comprises:
determining a position of the hovering event relative to the first stack;
determining a browsing direction based on the position of the hovering event; and
cycling through the representations of the open windows in the first stack in the determined browsing direction.

7. The method of claim 4, wherein the input is a scrolling event received from an input device, and wherein cycling through the representations of the open windows in the first 3D stack further comprises:
   determining a scrolling direction of the scrolling event; and
   cycling through the representations of the open windows in the first stack in the scrolling direction.

8. The method of claim 1, further comprising continuing to present the second desktop environment after the input to enter the second desktop environment has ceased.

9. The method of claim 1, further comprising:
   while in the second desktop environment, detecting a selection of an open window in a group, wherein the open window corresponds to a user interface of a computer software application;
   in response to detecting the selection:
      transforming the second desktop environment into the first desktop environment; and
      displaying the selected open window as an active window of the first desktop environment.

10. A computer-implemented method performed by one or more processors of a device, comprising:
   presenting a plurality of open windows in a first desktop environment;
   while the plurality of open windows are presented in the first desktop environment, detecting an input for browsing the plurality of open windows in a second desktop environment;
   in response to detecting the input:
      determining respective values of a grouping property associated with the plurality of open windows, and
      grouping the plurality of open windows into a plurality of groups of open windows in response to determining the respective values of the grouping property associated with the plurality of open windows, each group of open windows sharing a common value for the grouping property;
      in place of the plurality of open windows in the first desktop environment, presenting each group of open windows in a respective stack adjacent another respective stack in a second desktop environment, where the respective stack include three-dimensional (3D) representations of the open windows in the group, and permits user browsing through the representations one window at a time; and
      continuing to present the second desktop environment after the input to browse the plurality of open windows in the second desktop environment has ceased.

11. The method of claim 10, further comprising:
   detecting a selection of an open window in a group, wherein the open window corresponds to a user interface of a computer software application associated with a menu bar for user interaction with the computer software application;
   displaying the selected open window in a frontal view in a first region; and
   displaying, in a second region that is separate from the first region, the menu bar associated with the computer software application with which the open window is associated.

12. The method of claim 10, further comprising:
   while in the second desktop environment, detecting a selection of an open window in a group, wherein the open window corresponds to a user interface of a computer software application;
   in response to detecting the selection:
      transforming the second desktop environment into the first desktop environment; and
      displaying the selected open window as an active window of the first desktop environment.

13. A non-transitory computer-readable medium having instructions stored thereon, which, when executed by one or more processors, cause the processors to perform operations comprising:
   presenting a plurality of open windows at various locations in a first desktop environment;
   while the open windows are presented in the first desktop environment, detecting an input to enter a second desktop environment;
   in response to detecting the input to enter the second desktop environment, transforming the first desktop environment into the second desktop environment by:
      determining respective values of a grouping property associated with the plurality of open windows;
      grouping the plurality of open windows into a plurality of groups in response to determining the respective values of the grouping property associated with the plurality of open windows, each group of open windows sharing a common value for the grouping property; and
      causing each group of open windows to be presented in a respective stack adjacent another respective stack, where the respective stack includes representations of the open windows in the group and permits user browsing through the representations;
      replacing the plurality of open windows at various locations with the plurality of groups;
   while in the second desktop environment:
      detecting a selection of an open window in a group, wherein the open window corresponds to a user interface of a computer software application associated with a menu bar for user interaction with the computer software application; and
      in response to detecting the selection:
         displaying the selected open window in a frontal view in a first region; and
         displaying, in a second region that is separate from the first region, the menu bar associated with the computer software application with which the open window is associated.

14. The non-transitory computer-readable medium of claim 13, wherein the grouping property is an application type associated with the open windows, and each group of open windows include the open windows provided by a common application executing in the first desktop environment.

15. The non-transitory computer-readable medium of claim 13, wherein the operations further comprise:
   presenting a respective graphical representation indicative of the value of the grouping property associated with each group of open windows in proximity to the stack associated with the group.

16. The non-transitory computer-readable medium of claim 13, wherein the operations further comprise:
   detecting an input for browsing a first stack including a first group of open windows; and
   in response to the detecting, cycling through the representations of the open windows in the first stack one by one, presenting one representation in a first view while keeping other representations in the first stack in a second view.

17. The non-transitory computer-readable medium of claim 16, wherein the input is a hovering event by a pointing device over the first stack.

18. The non-transitory computer-readable medium of claim 17, wherein cycling through the representations of the open windows in the first stack further comprises:
  determining a position of the hovering event relative to the first stack;
  determining a browsing direction based on the position of the hovering event; and
  cycling through the representations of the open windows in the first stack in the determined browsing direction.

19. The non-transitory computer-readable medium of claim 16, wherein the input is a scrolling event received from an input device, and wherein cycling through the representations of the open windows in the first stack further comprises:
  determining a scrolling direction of the scrolling event; and
  cycling through the representations of the open windows in the first stack in the scrolling direction.

20. The non-transitory computer-readable medium of claim 13, wherein the operations further comprise:
  while in the second desktop environment, detecting a selection of an open window in a group, wherein the open window corresponds to a user interface of a computer software application;
  in response to detecting the selection:
    transforming the second desktop environment into the first desktop environment; and
    displaying the selected open window as an active window of the first desktop environment.

21. A non-transitory computer-readable medium having instructions stored thereon, which, when executed by one or more processors, cause the processors to perform operations comprising:
  presenting a plurality of open windows in a first desktop environment;
  while the plurality of open windows are presented in the first desktop environment, detecting an input for browsing the plurality of open windows in a second desktop environment;
  in response to detecting the input:
    determining respective values of a grouping property associated with the plurality of open windows, and
    grouping the plurality of open windows into a plurality of groups of open windows in response to determining the respective values of the grouping property associated with the plurality of open windows, each group of open windows sharing a common value for the grouping property;
    removing the plurality of open windows in the first desktop environment;
    presenting each group of open windows in a respective stack adjacent another respective stack in a second desktop environment, where the respective stack includes three-dimensional (3D) representations of the open windows in the group, and permits user browsing through the representations one window at a time; and
    continuing to present the second desktop environment after the input for browsing the plurality of open windows in the second desktop environment has ceased.

22. A system, comprising:
  one or more processors; and
  memory coupled to the one or more processors and storing instructions, the instructions, when executed by the one or more processors, cause the one or more processors to perform operations comprising:
    presenting a plurality of open windows at various locations in a first desktop environment;
    while the open windows are presented in the first desktop environment, detecting an input to enter a second desktop environment;
    in response to detecting the input to enter the second desktop environment, transforming the first desktop environment into the second desktop environment by:
      determining respective values of a grouping property associated with the plurality of open windows;
      grouping the plurality of open windows into a plurality of groups in response to determining the respective values of the grouping property associated with the plurality of open windows, each group of open windows sharing a common value for the grouping property; and
      causing each group of open windows to be presented in a respective stack adjacent another respective stack, where the respective stack includes representations of the open windows in the group and permits user browsing through the representations;
      replacing the plurality of open windows at various locations with the plurality of groups; and
      continuing to present the second desktop environment after the input to enter the second desktop environment has ceased.

23. A system, comprising:
  one or more processors; and
  memory coupled to the one or more processors and storing instructions, the instructions, when executed by the one or more processors, cause the one or more processors to perform operations comprising:
    presenting a plurality of open windows in a first desktop environment;
    while the plurality of open windows are presented in the first desktop environment, detecting an input for browsing the plurality of open windows in a second desktop environment;
    in response to detecting the input:
      determining respective values of a grouping property associated with the plurality of open windows, and
      grouping the plurality of open windows into a plurality of groups of open windows in response to determining the respective values of the grouping property associated with the plurality of open windows, each group of open windows sharing a common value for the grouping property;
      removing the plurality of open windows in the first desktop environment;
      in place of the plurality of open windows in the first desktop environment, presenting each group of open windows in a respective stack adjacent another respective stack in a second desktop environment, where the respective stack includes three-dimensional (3D) representations of the open windows in the group, and permits user browsing through the representations one window at a time; and
      continuing to present the second desktop environment after the input for browsing the plurality of open windows in the second desktop environment has ceased.

24. The system of claim 23, wherein the operations further comprise:
  while in the second desktop environment, detecting a selection of an open window in a group, wherein the open window corresponds to a user interface of a computer software application;

in response to detecting the selection:
    transforming the second desktop environment into the first desktop environment; and
    displaying the selected open window as an active window of the first desktop environment.

* * * * *